C. M. BILLINGS.
MOTOR PARCEL VEHICLE.
APPLICATION FILED OCT. 2, 1919.
1,393,005.
Patented Oct. 11, 1921.
2 SHEETS—SHEET 1.
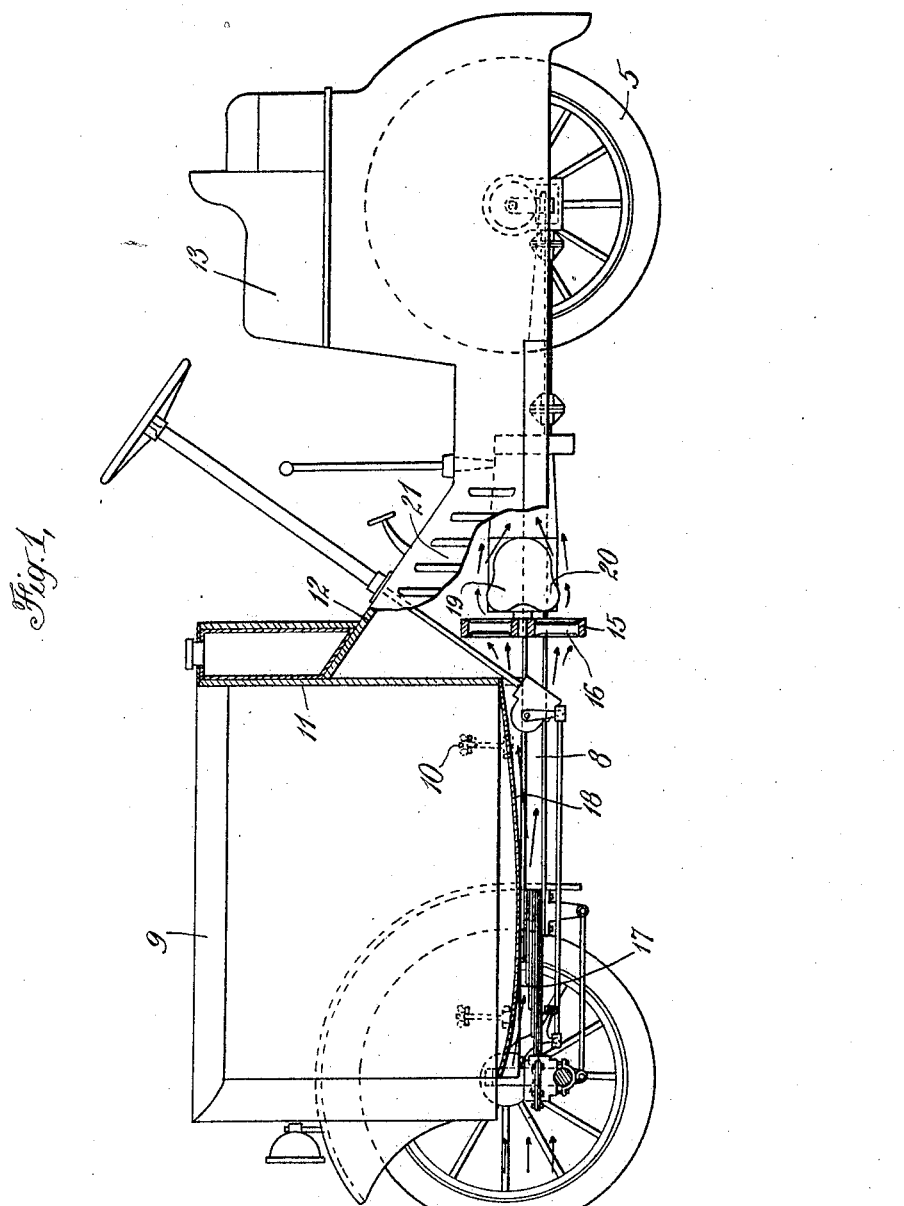

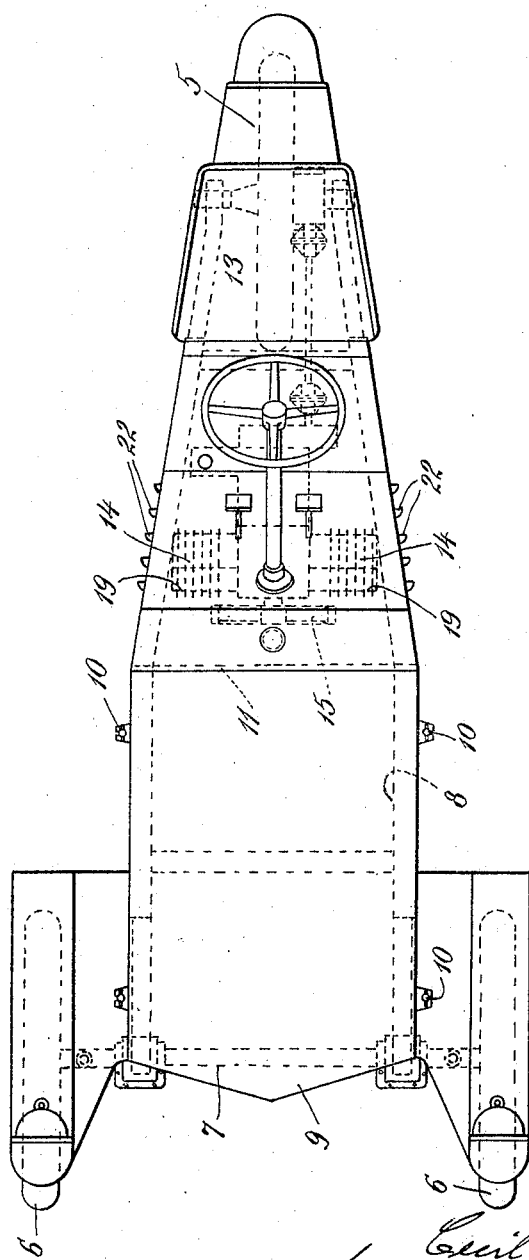

UNITED STATES PATENT OFFICE.

CECIL M. BILLINGS, OF BROOKLYN, NEW YORK, ASSIGNOR TO DELMORE MANUFACTURING CO. INC., OF NEW YORK, N. Y., A CORPORATION OF NEW YORK.

MOTOR PARCEL-VEHICLE.

1,393,005.  Specification of Letters Patent.  Patented Oct. 11, 1921.

Application filed October 2, 1919. Serial No. 327,996.

*To all whom it may concern:*

Be it known that I, CECIL M. BILLINGS, a citizen of the United States of America, and a resident of Brooklyn, county of Kings, and State of New York, have invented certain new and useful Improvements in Motor Parcel-Vehicles, of which the following is a specification, reference being had to the accompanying drawings, forming a part thereof.

My present invention relates particularly to motor vehicles of the type employed for light delivery purposes. The objects of the invention are to provide a vehicle of this type which will be relatively light and inexpensive both in the matter of first cost and in the matter of up-keep.

Special features of the invention relate to the mounting and cooling of the motor and to the construction of the parcel compartment.

These and various other features of the invention will appear more fully as the specification proceeds, and will be understood from a consideration of the accompanying drawings wherein I have disclosed the invention typified in a practical commercial form.

In the drawings referred to, Figure 1 is a side elevation and part sectional view of the vehicle.

Fig. 2 is a top plan view of the same.

The vehicle in the form disclosed is of three-wheel construction embodying the rear drive wheel 5 and the front steering wheels 6. The front wheels are connected by an axle 7 supporting a frame work 8 on which is mounted a parcel compartment or box 9, the latter preferably being detachable for purposes of loading and unloading, and being held detachably in place, for instance, by the clamp bolts, 10.

At the rear end of the parcel compartment is a stationary dash 11, and inclined downwardly and rearwardly from this dash is the foot board 12. At the rear and substantially over the drive wheel 5 is provided a suitable seat 13 for the operator.

The downwardly inclined foot board provides a compartment therebeneath, which is highest at the front and tapered in height toward the rear of the vehicle. Within this chamber is the motor which preferably is of the internal combustion type.

As disclosed herein, this motor is of the opposed cylinder type comprising the oppositely disposed cylinders 14, between which is mounted the crank shaft carrying the fly wheel 15. This motor is indicated as of the air cooled type and is shown mounted crosswise of the frame with the fly wheel disposed at the forward side thereof in the higher portion of the motor chamber. The fly wheel is shown formed with fan blades 16 for inducing a current of air from the front and for forcing the same rearwardly over and about the motor cylinders. The downwardly inclined surface of the foot board overlying the fly wheel and motor cylinders confines this current of air and causes the same to flow downwardly and about the cylinders.

The flow of the cooling current of air rearwardly beneath the vehicle to the motor is facilitated by providing a deflector beneath the forward portion of the vehicle, involving first a downwardly inclined or curved portion 17 and an upwardly curved or inclined portion 18 extending from the lowest point of the downwardly and rearwardly inclined portion rearwardly towards the motor chamber. The arrows in Fig. 1 denote the flow of the current of air first downwardly and thence upwardly beneath the vehicle body to and through the fan wheel over and about the motor cylinders. I find this arrangement provides very effective cooling of the motor.

Another feature as regards the cooling of the motor is the location of the valve chambers 19—20 at the forward sides of the motor cylinders directly in rear of the fly wheel, as indicated in Fig. 1. This provides in effect for a stream-line flow of cooling air from the fly wheel about the motor cylinders, effectually cooling the valves and keeping the cylinders cooled to the proper degree.

At the sides, the motor chamber is preferably closed in by the walls 21 shows as arranged on lines converging rearwardly toward the central drive wheel. These side walls are shown provided with ventilating louvers 22 to permit free escape of the air and to prevent it "pocketing" within the rearward tapering motor chamber.

By means of the construction and arrangement disclosed, the motor is disposed so as to occupy space which would otherwise be lost and the shape and arrangement of this space is utilized to assist in the proper cooling of the motor. In this construction also the motor is readily accessible at all times by simply taking up the foot board.

The detachability of the parcel compartment is of special advantage, in that it permits the vehicle being made continuous use of, since extra compartments may be provided and kept loaded ready to be secured on the vehicle as soon as the empty compartment is removed therefrom.

The stream-lining of the air flow beneath the forward portion of the vehicle reduces wind resistance, eddies, etc., and provides for a smooth continuous flow of cooling air direct to the motor, and said flow as above pointed out, is continued by the fan fly wheel and stream line construction of the motor.

What I claim is:

1. A motor vehicle of the class described, provided with a rearwardly extending air deflector beneath the forward portion of the same, and an internal combustion engine of the opposed cylinder type, and arranged at the rearward portion of said air deflector with the cylinders disposed transversely of the vehicle, said engine having a flywheel at the forward side thereof, provided with fan blades for carrying the current of air from the deflector rearwardly, over the motor cylinders, the said motor cylinders having valve pockets at the forward side thereof immediately in the rear of the flywheel to receive the full effect of the cooling flow from said flywheel, and to, in effect, stream-line the motor toward the rear.

2. A motor vehicle of the class described provided with a downwardly and rearwardly inclined foot board and an internal combustion engine of the opposed cylinder type disposed beneath the foot board with the cylinders transversely of the vehicle and the fly wheel at the forward side thereof, said fly wheel being provided with fan blades for inducing a current of cooling air from beneath the front of the vehicle rearwardly beneath the downwardly inclined foot board and about the cylinders, and the cylinders of said motor having valve pockets at the forward side thereof directly in rear of the fan fly wheel referred to.

3. A motor vehicle of the class described provided with a downwardly and rearwardly inclined foot board and an internal combustion engine of the opposed cylinder type disposed beneath the foot board with the cylinders transversely of the vehicle and the fly wheel at the forward side thereof, said fly wheel being provided with fan blades for inducing a current of cooling air from beneath the front of the vehicle rearwardly beneath the downwardly inclined foot board and about the cylinders, and an air deflector beneath the forward portion of the vehicle in advance of the fly wheel and provided with a downwardly and rearwardly inclined portion terminating in an upwardly inclined portion extending rearwardly toward the fan fly wheel.

4. A motor vehicle of the class described provided with a downwardly and rearwardly inclined foot board and an internal combustion engine of the opposed cylinder type disposed beneath the foot board with the cylinders transversely of the vehicle and the fly wheel at the forward side thereof, said fly wheel being provided with fan blades for inducing a current of cooling air from beneath the front of the vehicle rearwardly beneath the downwardly inclined foot board and about the cylinders, and an air deflector beneath the forward portion of the vehicle in advance of the fly wheel and provided with a downwardly and rearwardly inclined portion terminating in an upwardly inclined portion extending rearwardly toward the fan fly wheel, said deflector serving to stream-line the air currents rearwardly to the motor, and the motor cylinders having the valve enlargements at the forward side thereof to thereby stream-line the air currents rearwardly over the motor cylinders.

5. A motor vehicle of the class described provided with a downwardly and rearwardly inclined foot board and an internal combustion engine of the opposed cylinder type disposed beneath the foot board with the cylinders transversely of the vehicle and the fly wheel at the forward side thereof, said fly wheel being provided with fan blades for inducing a current of cooling air from beneath the front of the vehicle rearwardly beneath the downwardly inclined foot board and about the cylinders, the motor compartment beneath the downwardly inclined foot board having rearwardly convergent side walls provided with ventilating louvers therein.

In witness whereof, I hereunto set my hand this 27th day of September, 1919.

CECIL M. BILLINGS.